United States Patent [19]

Duke

[11] Patent Number: 4,984,416
[45] Date of Patent: Jan. 15, 1991

[54] APPARATUS AND METHODS FOR REMOVING FOLDS IN THE CONFRONTING MATERIAL AT THE OPEN EDGES OF FLEXIBLE PACKAGING MATERIAL PRIOR TO SEALING

[76] Inventor: Horace W. Duke, Rte. 1, Box 165, Thomasville Rd., Chapmansboro, Tenn. 37035

[21] Appl. No.: 298,407
[22] Filed: Jan. 18, 1989
[51] Int. Cl.$^5$ .............................................. B65B 7/02
[52] U.S. Cl. ......................................... 53/480; 53/67; 53/371; 53/372; 493/406
[58] Field of Search ............. 53/372, 371, 373, 138 A, 53/480, 481, 482, 479, 378, 67, 77; 493/406

[56] References Cited

U.S. PATENT DOCUMENTS

| | | | |
|---|---|---|---|
| 3,163,969 | 1/1965 | Irwin et al. | 53/138 A X |
| 3,420,034 | 1/1969 | Saraisky et al. | 53/372 X |
| 3,471,990 | 10/1969 | Bonuchi et al. | 53/372 X |
| 3,552,088 | 1/1971 | Niwa | 53/372 X |
| 3,621,632 | 11/1971 | Browning | 53/138 A |
| 3,914,917 | 10/1975 | Young | 53/372 X |
| 4,069,646 | 1/1978 | Slomp et al. | 53/371 X |
| 4,723,390 | 2/1988 | Duke | 53/372 |

Primary Examiner—James F. Coan
Attorney, Agent, or Firm—J. C. Kesterson

[57] ABSTRACT

Apparatus and methods for removing overlapping material such as occurs in wrinkles and folds in the open edge of a pliable package, such as plastic prior to sealing the package. The apparatus includes a set of transport belts which grip the open edges of the package and move them in a selected direction of travel. The open package edges then encounter a set of opposing programmable pinch wheels before the trailing edge of the package leaves the first set of transport wheels. The pinch wheels have a rate of rotation selected to move the package edge along the direction of travel at a speed faster than that provided by the transport belts. Consequently, the leading package edge is pulled taut. Subsequent to the trailing edge of the package leaving the transport belt, the leading edge of the open package edges encounters a second set of transport wheels which also move the package edge in the selected direction of travel. Upon this engagement, and while a substantial portion of the package edges still must travel through the programmable pinch wheels, rotation of the pinch wheels is stopped and the pinch wheels are then driven so as to be biased to a "null" position or against allowing the package edges to move in the direction of travel. They are also programmed to have less torque available to maintain the zero or "null" bias than the torque provided to the second set of transport wheels. Thus, if a fold or wrinkle is encountered it will be eliminated as the pinch wheel passes over the fold and then returns to its zero or "null" position.

23 Claims, 6 Drawing Sheets

APPARATUS AND METHODS FOR REMOVING FOLDS IN THE CONFRONTING MATERIAL AT THE OPEN EDGES OF FLEXIBLE PACKAGING MATERIAL PRIOR TO SEALING

TECHNICAL FIELD

This invention relates generally to apparatus and methods for packaging a product in pliable packaging materials such as plastic film or plastic sheet material, and more particularly to apparatus and methods for removing folds and wrinkles from such packaging material prior to sealing the package by heating or other methods. The apparatus and methods of this invention are particularly suitable for use where a liquid and/or air tight seal is required and where folds or wrinkles in the packaging material at the seal would tend to prevent such a liquid or air tight seal. The apparatus and methods of this invention are further suited to operate in combination with presently available packaging systems, and sealing and trimming apparatus.

BACKGROUND ART

Both transparent and opaque plastic films are used as wrapping and/or packaging materials in substantially every area of manufacturing and marketing of modern commerce. The plastic packaging materials include rigid materials which provide protection from outside impact or crushing forces, including the somewhat flexible but brittle packaging materials which provide a form fit around the product. This type of plastic packaging material may typically be heated so that it shrinks around the product. In addition, pliable plastic films which vary from being extremely thin and flexible to those which are substantially thicker and less pliable are used which do not always protect the product from outside crushing or impact forces, but do provide excellent protection from an undesirable environment, such as moisture, dirt, sand, corrosive air or gases, etc. The present invention is primarily concerned with pliable materials such as plastic used in packaging which must effectively seal the packages contents from the environment and/or contamination.

More particularly, the present invention is concerned with removing all folds and wrinkles in two confronting edge portions of the packaging material at the open end of a package prior to sealing or bonding the two confronting edges one to the other to create a liquid and/or air tight package. Removing the folds or wrinkles in the two confronting edge portions helps to insure that the resulting seal will be fluid tight. Tests on a prototype apparatus incorporating the features of this invention indicate that the rejection rate caused by ineffective seals can be decreased from from around 15% to 20% down to substantially zero.

Therefore, it is an object of this invention to provide methods and apparatus for removing folds and wrinkles in confronting portions of an edge prior to sealing or bonding the open edge.

It is another object of this invention to provide simple and inexpensive apparatus and methods for preparing the edge portion of an open pliable plastic package prior to sealing the edge of the package so as to facilitate achieving a liquid and/or air tight package.

Although the applicant is not aware of any prior art references or actual apparatus which is similar to the apparatus and methods of the present invention, some prior art references which illustrate the known state of the art include U.S. Pat. No. 4,723,390 issued to the present inventor Horace W. Duke on Feb. 9, 1988; U.S. Pat. No. 3,621,632 issued to S. A. C. Browining on Nov. 23, 1971; U.S. Pat. No. 3,552,088 issued to Akiro Niwa on Jan. 5, 1971; U.S. Pat. No. 3,471,990 issued to J. A. Bonuchi et al on Oct. 14, 1969; U.S. Pat. No. 3,420,034 issued to A. B. Saraisky et al on Jan. 7, 1969; and U.S. Pat. No. 3,163,969 issued to J. F. Irwin et al on Jan. 5, 1965.

The Browing and Irwin et al patents deal with closing the end of a plastic bag around a loaf of bread, and both patent specifications show how the open end of the bag of bread is gathered and then the gathered plastic material is enclosed and held closed with a closure tie or device.

The Niwa patent discloses apparatus for individually and successively packaging articles by the use of continuous sheets of heat-sealable packaging material. The apparatus also shows the sealed package being separated or cut from the continuous packaging material.

The Bounchi et al patent discloses packaging apparatus which has heating structure for producing a line of seal across the initially open end of a polyethylene bag containing poultry products. The apparatus includes a sponge which clamps against the package prior to sealing to expel air so as to produce a tight package. The apparatus also provides a pair of opposed rollers which receive the initially open end of the bag and pulls the end away from the remainder of the bag to stretch the bag over the product so as to allow removal of excess material.

The Saraisky et al patent discloses apparatus for packaging articles in a close-fitting package without the necessity of shrinking the wrapper or expanding the article after sealing the package. The close fitting package is accomplished by incorporating with the heat-sealing means a heat-shielding sheet material-fitting means arranged to draw the wrapping material towards and tightly against substantially all of the exterior surfaces of the article being wrapped. This includes drawing the material tight against the surfaces immediate adjacent to the seal, while shielding the sheet material and the article from the heat arising from the heat-shielding means except at the point that the seal is being formed so as to eliminate loose wrapping material around the package.

Thus, although all of the above discussed patents deal with closing a pliable plastic packaging material around a product, and although the Duke, Niwa, Bonuchi, and Saraisky patents deal with sealing confronting edge material of a package, none of the patents teach or even suggest the unique apparatus and methods of the present invention for substantially eliminating all wrinkles and folds from such confronting edges of a package prior to sealing.

SUMMARY

Other objects and advantages of the invention will in part be obvious, and will in part appear hereinafter, and will be accomplished by the present invention which provides methods and apparatus for removing wrinkles, folds and/or overlapping material in the open edges of a pliable plastic package prior to sealing the package. The apparatus includes a first means, such as opposing wheels or belts, which engage the package edge along a predetermined path in a selected direction and at a selected speed. First and second pinch wheels are located along the predetermined path in opposing relationship with each other so that their perimeter or circumferential edges are substantially in contact with each other allowing them to engage or grip the open edge material of the package to be sealed. A second means such as a pair of opposing wheels or transport belts which also engage and move the package edge with a known or first torque along the predetermined path is located at a position downstream of the pinch wheels. The first and second pinch wheels are preferably rotatively driven by two separate and programmable stepper motors in response to control or programming signals. A programming means or control circuitry or means is provided to generate a pair of control signals to control the driving means or stepper motors. One of the two control signals causes the drive means or stepper motors to rotate the pinch wheels so as to move the package edge in the selected direction of travel and at a speed greater than the speed selected for the first moving means. It is important to understand, that the first moving means and the pinch wheels engage the package edge at the same time, so as to pull the package edge taut between the two. In a preferred embodiment, the torque available from the opposing pinch wheels and that available from the first moving means is selected to prevent slipping between the pinch wheels, moving means, and the packaging material. While the package edge is still engaged by the pinch wheels, but after the edge has been disengaged from the first moving means, the package edge is engaged by the second moving means. The second control signal or signals then causes the pinch wheels to be biased against rotation for moving the package edge in the direction of travel. In the preferred embodiment, there is included a package edge detector located along the travel path between the first moving means and the programmable pinch wheels for purposes of determining when the first and second control signals should be provided to the pinch wheels. It is important to understand that the torque on the biased pinch wheels must be selected or controlled to be less than the torque on the second moving means. In this manner, the folds or wrinkles or overlapping material is eliminated at the open package edge so that an air or liquid tight seal can be achieved.

BRIEF DESCRIPTION OF THE DRAWINGS

The above mentioned features as well as other features of the present invention will be more clearly understood from the consideration of the following description in connection with the accompanying drawings in which.

BEST KNOWN MODE FOR CARRYING OUT THE INVENTION

Figure 1:
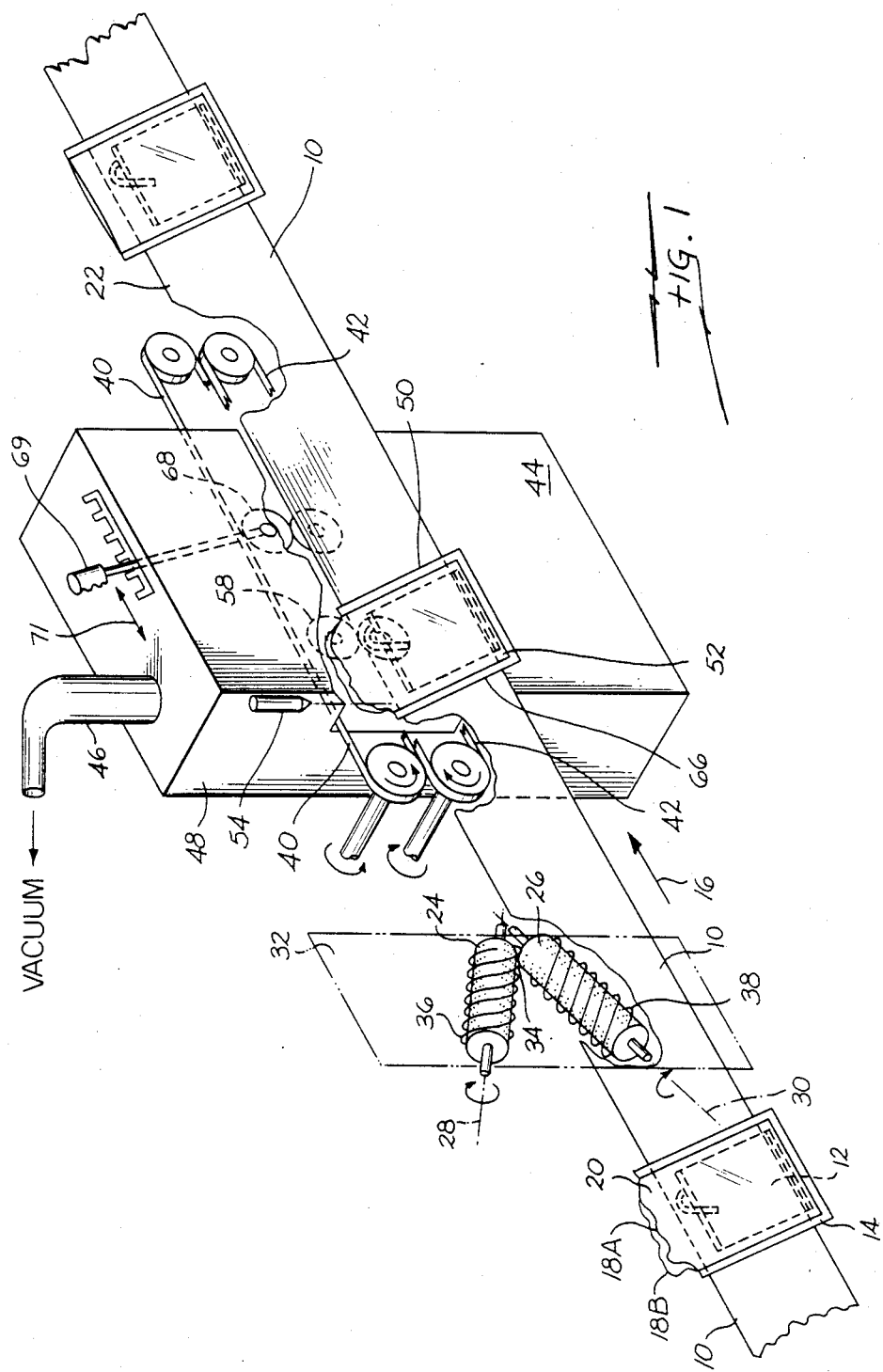
FIG. 1 is a perspective view of the apparatus incorporating features of the invention.

Referring now to FIG. 1, there is shown a perspective view of apparatus for preparing items to be packaged in pliable plastic material with a liquid or air tight seal which incorporate teachings of this invention. As shown, conveyor belt 10 moves a product 12 which has been placed in a plastic bag 14 along a predetermined path as indicated by arrow 16. As seen in FIG. 1, the two edges 18A and 18B of plastic bag 14 have not yet been sealed around the product, and in fact have wrinkles and folds and are not even properly aligned such that any seal, much less a satisfactory seal can be achieved. As can also be seen, the plastic bag or packaging 14 containing the product 12 (which as an example could be a package of blood, blood plasma or other intravenous fluid (IV) sealed in a second package) has been placed on conveyor 10 such that the excess packaging material 20 extends beyond edge 22 of conveyor belt 10, and transverse thereto. The excess plastic packaging material 20 is then gathered by a pair of cylindrical shaped brushes 24 and 26 which are positioned such that their axis of rotation 28 and 30 define a vertical plane 32 which is approximately parallel to the direction of travel or predetermined path. The brushes 24 and 26 are further positioned so as to define a "V" (which is on its side) such that the rotational axis 28 and 30 intersect. The brushes rotate in opposite directions and toward each other so that excess material 20 is pulled away from and transverse to conveyor belt 10. Therefore, as the package moves in the direction of travel along the predetermined path, it will first encounter the open end of the "V" and move toward the apex or nip 34 of the "V". In a preferred embodiment, the tips of the bristles of the two brushes 24 and 26 have a small overlap. Thus, as the open end of a package passes between rotating brushes 24 and 26, the open edges 18A and 18B are better aligned so as to be in a confronting relationship with each other and such that the edges can be sealed around the package.

The confronting edges of a package may be sufficiently aligned and smooth after they pass through the "V" oriented brushes 24 and 26 to achieve a satisfactory seal for many packaging applications. However, it is not uncommon for some overlapping material, wrinkles and/or folds to still be present which will prevent a liquid or air tight seal. Thus, if sealing of the confronting open edges of a package were to take place in this condition, there would be a large percentage of packages which did not receive an air or liquid tight seal. Therefore, if the package must be protected from the environment or any sort of contamination, the seal would not be satisfactory, and consequently the number of rejected packages would be unacceptably high. For example, presently available information indicates that commercially available packaging equipment running at only about forty (40) feet per minute produce sealed packages having a rejection rate of between 15% and 20%.

The present invention provides apparatus and methods to further eliminate wrinkles, folds and other such overlapping of packaging material which has successfully reduced the rejection rate due to unsatisfactory seals to substantially 0% while running at speeds of about one hundred fifty (150) feet per minute. For example, although details of the construction of brushes 24 and 26 is not believed to be critical, they are commonly constructed by securing or wrapping a long "ribbon" of bristles to and around a cylindrical base member in a helical or spiral manner many times. In this regard, it has been found that better alignment and/or smoothing of the confronting edges 18A and 18B can be achieved by selecting the direction of the helical wrap, as indicated by spiral lines 36 and 38 such that the spirals do not parallel each other during rotation and at the nip 34, but tend to cross each other. Choosing the helical wrap of the bristles as indicated, results in increased vibration or agitation of the packaging material at the open edge as it passes through nip 34 which in turn is believed to result in smoother confronting edges with less folds or overlapping material.

Figure 2:
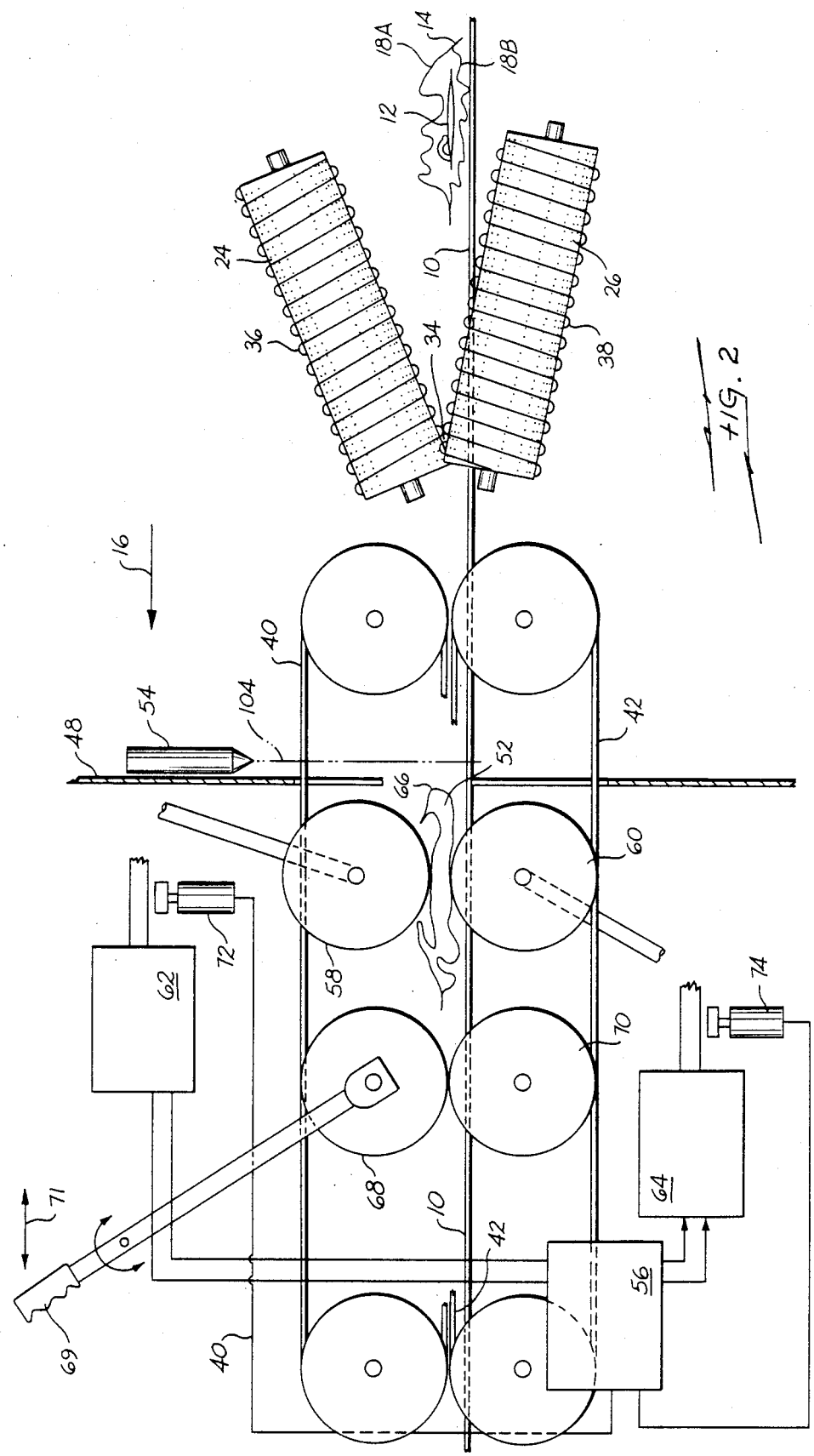
FIG. 2 is a front view of the apparatus of FIG. 1 with the cover removed.

In addition, as shown in FIGS. 1 and 2, subsequent to passing through brushes 24 and 26, the packaging material forming the two open edges is engaged by a transport means such as opposing and synchronized transport belts 40 and 42. These belts 40 and 42 will move the plastic bag 14 with the product 12 into and through the remaining apparatus of this invention. It should also be noted that subsequent to encountering transport wheels 40 and 42 the open edges (18A and 18B) of the package passes into the enclosure 44 which in the preferred embodiment continuously experiences a lower pressure than ambient pressure as a result of vacuum line 46. The lower pressure maintained within enclosure 44 is believed to facilitate operation of the apparatus of this invention in a manner to be discussed in greater detail hereinafter.

Opposing transport belts 40 and 42, are typically driven by some means (not shown) such as for example only, a constant speed motor or a gear take off from conveyor belt 10 such that the confronting edges 18A and 18B are gripped and pass between the two opposing transport belts 40 and 42 at the same speed as conveyor belt 10 moves the plastic bag 14. As shown, just prior to passing wall 48 and entering enclosure 44 the leading edge of a package, such as edge 50 of package 52 will be picked up by edge detector 54. In a preferred embodiment, edge detector 54 transmits a signal to a control or programming means 56 which in turn activates a means for driving a pair of opposing pinch wheels 58 and 60 such that the nip between wheels 58 and 60 will move a package edge at a speed which is greater than the speed of the package edge through transport belts 40 and 42. Typically pinch wheels 58 and 60 will be made of aluminum or other low inertia, light weight material with a rubber perimeter. In the embodiment of FIGS. 1 and 2, the drive means is preferably two independent and programmable stepper motors 62 and 64. Thus, once the leading edge 50 of the confronting open edges 18A and 18B engage the rotating pinch wheels 58 and 60, the leading portion of the edge is urged through pinch wheels 58 and 60 at a rate faster than the remaining or trailing portions of open edges 18A and 18B. The faster movement of the leading portion of the open edge with respect to the remaining portion stretches the packaging edge material taut between opposing transport belts 40 and 42, and opposing pinch wheels 58 and 60. Once the package edge has been pulled taut, the pinch wheels slow down to a speed which moves the package edges in sync with conveyor belt 10. Although slipping of either the transport belts 40 and 42 or or the pinch wheels 58 and 60 or both with respect to the confronting edge of packaging material or bag 14 may be acceptable in some applications, in most applications, it may be desirable or even necessary to select or program stepper motors 62 and 64 such that the torque available to pinch wheels 58 and 60 is less than that available to package edges 18A and 18B from the transport belts 40 and 42. By such a selection or programming, the open confronting edges 18A and 18B will be pulled taut between the transport wheels 40 and 42 and the pinch wheels 58 and 60, but the possibility of damage to the plastic material due to heat and/or friction which could occur if one or both sets of wheels are driven hard enough to slip on the packaging material once the edges are pulled taut is eliminated.

In the preferred embodiment, prior to the confronting edge material 18A and 18B leaving pinch wheels 58 and 60, edge detector 54 will detect trailing edge 66. Detection of trailing edge 66 will result in a signal being provided to programming means 56 which means will then direct stepper motors 62 and 64 to stop driving pinch wheels 58 and 60. Prior to trailing edge 66 being released from pinch wheels 58 and 60, the leading edge 50 of the package is then engaged by another transport means, such as a second set of opposing and synchronized transport wheels 68 and 70, or a pair of opposing and synchronized transport belts. As shown in FIG. 2, there is included means 69 for adjusting the spacing between pinch wheels 58 and 60, and transport wheels 68 and 70 as indicated by double headed arrow 71. Adjustment 69 allows for fine tuning of the apparatus, but perhaps even more important, allows the apparatus to be used to process packages of different dimensions. Once the packaging material is engaged by transport wheels 68 and 70, stepper motors 62 and 64 are programmed to independently maintain pinch wheels 58 and 60 with a bias against any further movement of the package edge therethrough.

Preferably, this bias is selected to independently maintain the pinch wheels 58 and 60 at a selected fixed or null position. That is, either one of the two opposing pinch wheels 58 and 60 may independently be forced to rotate against its bias without any effect or movement of the other pinch wheel. Thus, it should be appreciated that the torque available at each of the pinch wheels 58 and 60 should be substantially constant and must be less than that imparted to packaging material edges 18A and 18B by opposing and synchronized transport wheels 68 and 70. Consequently, pinch wheels 58 and 60 may be forced to rotate against their bias and without slipping with respect to the packaging material. Operation of the invention may be even better understood by reference to the series of drawings FIGS. 3A through 3J, to be discussed hereinafter. The elimination of wrinkles, folds, and other overlapping of edge material is described in detail by these drawings. Thus, the open confronting edges of the package will be coextensive and smooth with respect to each other so as to allow the two confronting edges to be bonded or sealed in an air or liquid tight manner.

In the embodiment illustrated in the drawings, stepper motors 62 and 64 move in incremental steps, and the number of such steps in a complete revolution of 360 degrees is known. Thus, the speed may be expressed as steps per second (or steps per minute). Further, as shown, a counting or monitoring means such as encoders 72 and 74 counts or monitors each such step that the pinch wheels 58 and 60 (and consequently stepper motors 62 and 64 respectively) are forced to rotate against the zero or neutral bias (even in excess of 360 degrees). Consequently, encoders 72 and 74 preferably can count a number of incremental steps which is greater than that representing 360 degrees of revolution.

As was mentioned above, the pinch wheels 58 and 60 and the transport wheels or belts 68 and 70 are located within enclosure 44, which enclosure 44 is subjected to a vacuum to drop the atmospheric pressure in the enclosure by about three to five inches of mercury. The primary purpose of the lower pressure is to facilitate the removal of excess air in the unsealed package prior to sealing. Tests indicate that the amount of excess air remaining in a package containing a sealed IV bag can be reduced from about 100 cc to about 25 cc. Thus, when the package enters the enclosure 44 the pressure of the air inside the package is substantially at ambient pressure. Therefore, since enclosure 44 is at a pressure less than ambient, the excess air in the package tends to move out of the package between the two open and confronting edges 18A and 18B. Another benefit to removing the excess air from the package in this manner is that the flow of air between the confronting edges provides lubrication in the form of an air bearing or layer which is believed to facilitate movement of the material comprising the two edges with respect to each other and thereby helps to remove the folds, wrinkles or overlap of such material.

Figure 3A:
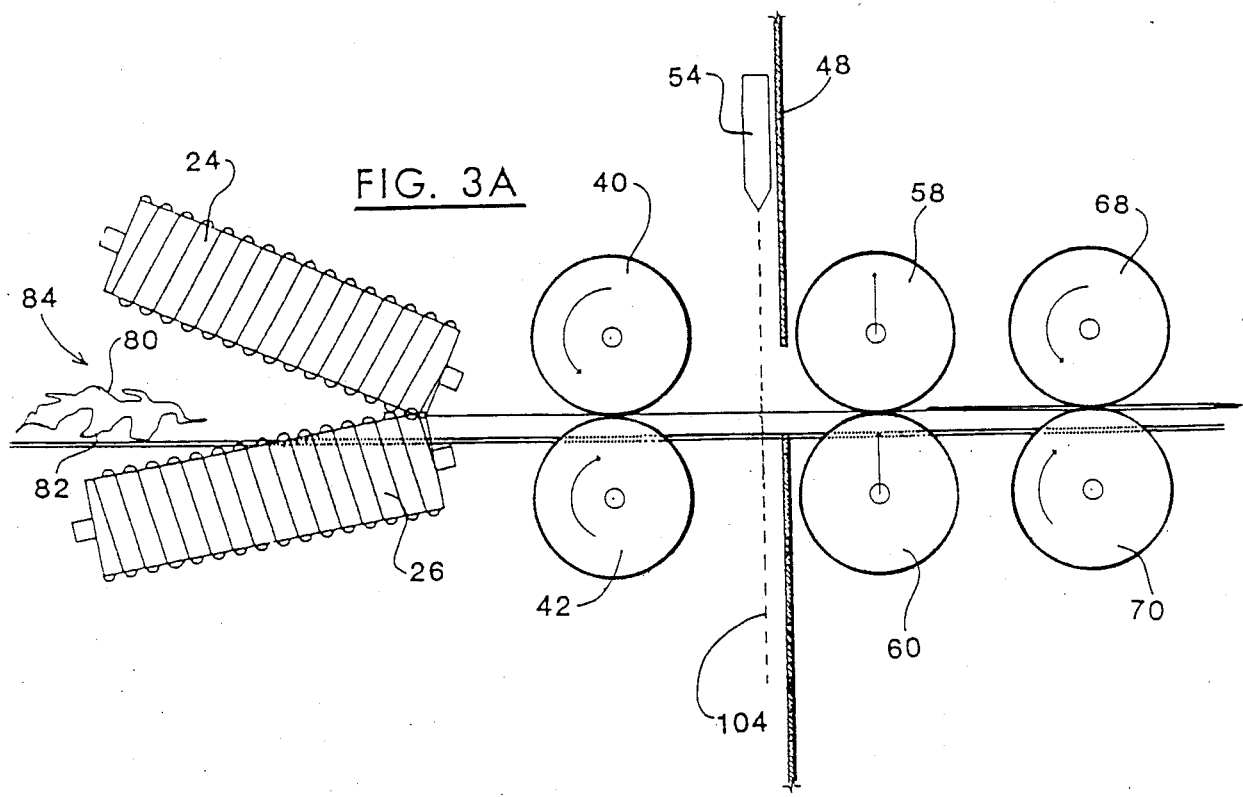
FIGS. 3A through 3J are diagrammatic sketches representing the interaction of the programmable pinch wheels with the other means for moving and the sequential steps a package encounters as it progresses through the pinch wheels to remove folds and wrinkles.
Figure 3B:
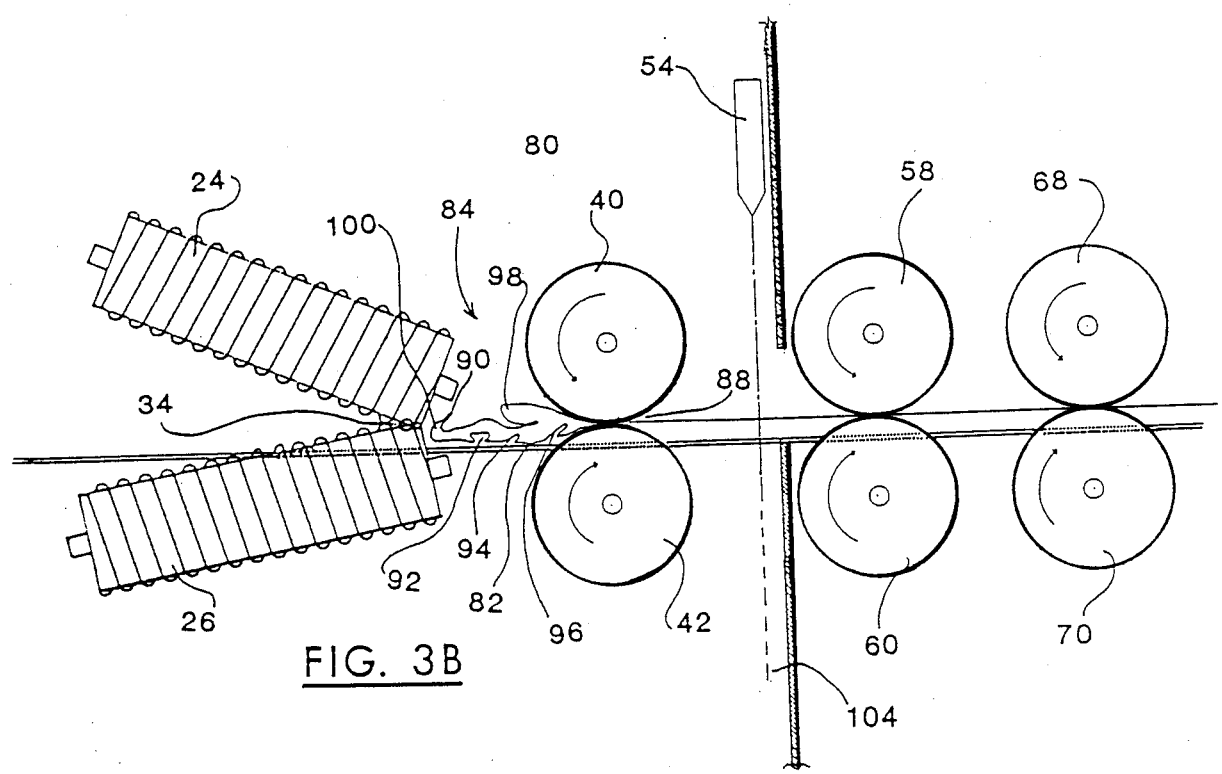

Referring now to FIGS. 3A through 3J, there is shown a series of sketches which illustrate the operation of the apparatus of this invention as it removes the remaining wrinkles and folds from the open confronting edges. As shown in FIG. 3A, the unsealed edges 80 and 82 of a plastic package 84 have not yet encountered the "V" oriented brushes 24 and 26, and as can be seen, there are many folds and wrinkles in the edge material. In FIG. 3B, plastic package 84 has passed through the "V" brushes 24 and 26, and side edge 86 has just encountered the nip 88 between transport belts 40 and 42. Also as shown in FIG. 3B, open edges 80 and 82 of package 84 are illustrated as having substantially cleared brushes 24 and 26 before side edge 86 encounters nip 88 between transport belts 40 and 42. However, in actual practice, transport belts 40 and 42 may be located substantially closer to the nip 34 between brushes 24 and 26 such that portions of the package edges 80 and 82 are passing through the brushes and the transport wheels at the same time. Side edge 86 and side edge 90 are illustrated with an exaggerated thickness to aid in the explanation of the invention. As can be seen the open edges 80 and 82 of the plastic package has less wrinkles than before passing brushes 24 and 26, but there are still several folds and/or areas of overlapping material such as is indicated by reference numbers 92, 94, 96, 98 and 100. These folds can prevent the package from receiving a liquid or air tight seal.

Figure 3C:
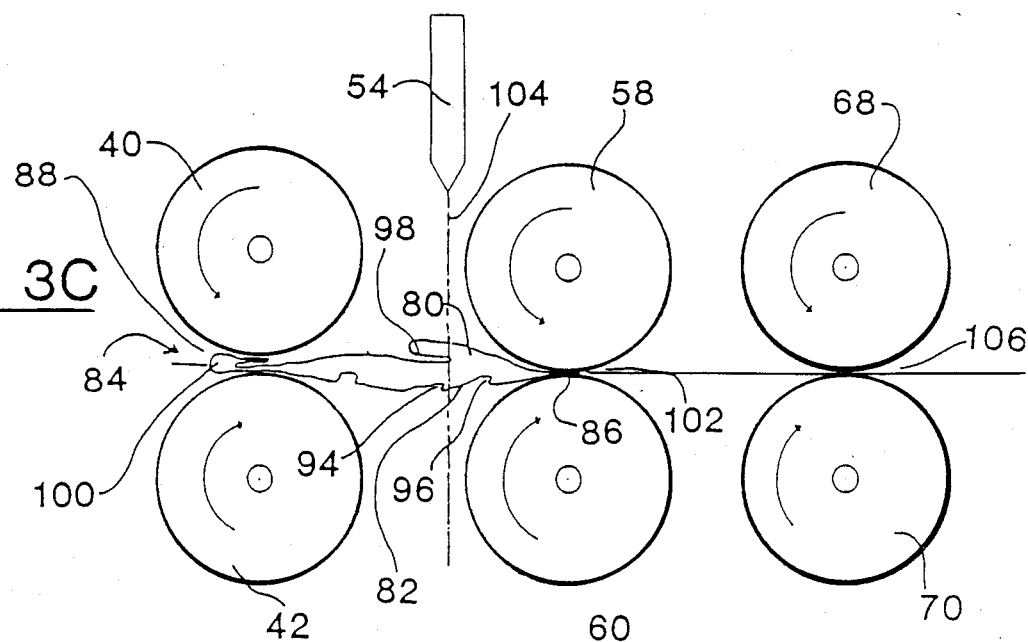
Figure 3D:
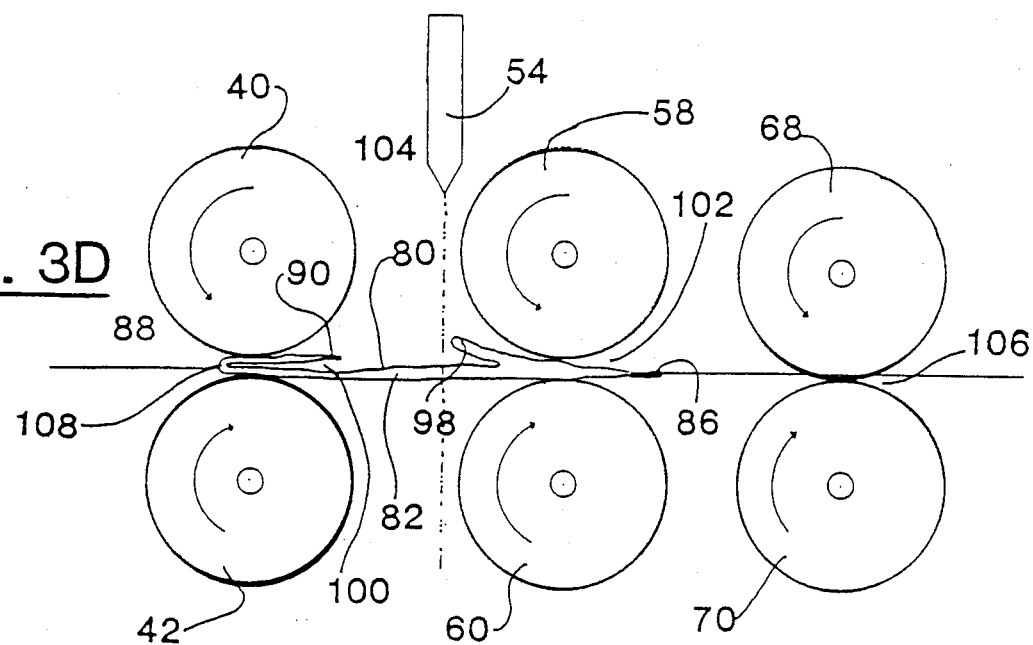

It should be recalled that transport belts 40 and 42 will move the open edges 80 and 82 at substantially the same speed that the conveyor belt 10 is moving the package 84. Thus, as shown in FIG. 3C, the same folds and overlapping material that was present at open edges 80 and 82 prior to being transported through transport belts 40 and 42 are still present just as the side edge 86 encounters the nip 102 of pinch wheels 58 and 60. As was discussed above, the preferred embodiment of the invention includes edge detector 54 which will detect when the leading edge of the package 84 passes the point indicated by dotted line 104. In FIG. 3C, the leading edge of the package and side edge 86 are shown as being the same. Upon the detection of the leading edge or package edge 86, the control means or programmer will send the necessary commands or control signals to stepper motors 62 and 64 so as to drive both pinch wheels 58 and 60 at ainitial speed which will tend to pull package open edges 80 and 82 through the pinch wheels at a speed which is greater than the speed the edges are moving through transport wheels 40 and 42. Consequently, the package edges will be pulled taut as illustrated in FIG. 3D. Then according to a preferred embodiment the pinch wheels will be slowed down so as to move the package edges at the same speed as the transport belts. However, as can be seen folds 98 and 100 still remain in package open edges 80 and 82. It should also be noted that the side edge 90 is not actually trailing, but is folded over on top. Although the actual speeds at which transport belts and/or wheels 40 and 42 and transport wheels 68 and 70 are selected to move the package edges varies the speed ratio with reference to conveyor belt 10 is essentially one to one. The speed of pinch wheels 58 and 60 varies from zero RPM when holding bias to synchronism with transport wheels 68 and 70 and conveyor belt 10, to 10,000 RPM when extending leading edge in the machine direction to minus 10,000 RPM when resetting back to "null" or zero reference.

Figure 3E:
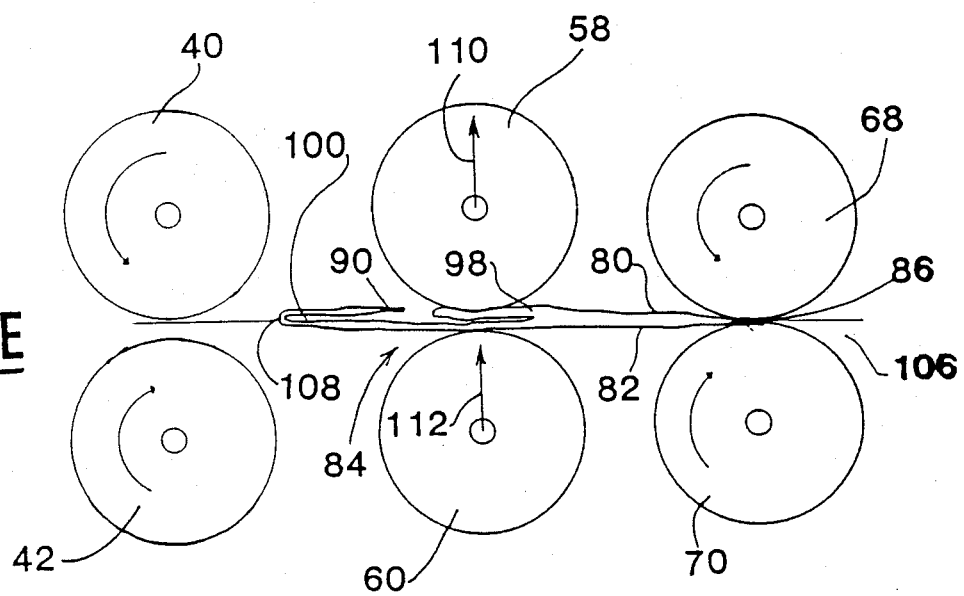

Once the package 84 has moved through pinch wheels 58 and 60 to the position shown in FIG. 3E, leading edge 86 will have encountered and been firmly gripped by nip 106 of continuous speed transport wheels 68 and 70 which are synchronus with conveyor belt 10. However, a substantial portion of the package edges 80 and 82 still must move through pinch wheels 58 and 60. At this point, new commands or control signals are sent to the stepper motors 62 and 64 to stop the continuous rotation of the pinch wheels and to bias them individually to maintain a null or zero reference. Sending the second control signals to stepper motors 62 and 64 at the appropriate time to bias the pinch wheels to a "null" position may be achieved in several ways. As was discussed hereinabove, the detection of the trailing edge of the package by detector 54 may be used to "stop the rotation" of the pinch wheels. In a similar manner, a second detector could be used to detect or monitor the exact instant the package edge 86 is gripped by transport wheels 68 and 70. Alternately, the second control signal may simply be sent at a precise time period, step interval or distance after the first control signal. Likewise, if step motors are used, this is possible since the distance between detector 54 and nip point 102 is a fixed number of step of rotation of the pinch wheels 58 and 60 which can easily be determined. The "null" bias or zero reference is represented by the arrows 110 and 112 on pinch wheels 58 and 60 respectively pointing straight up or to the 12:00 o'clock position as shown in FIG. 3E. It will be recalled however, that the torque available to pinch wheels 58 and 60 is selected to be less than the torque applied to package edges 80 and 82 by continuous transport wheels 68 and 70. Thus, if the edge material of both open edges 80 and 82 is straight and taut between opposing pinch wheels 58 and 60 and opposing transport wheels 68 and 70, both pinch wheels will be forced to rotate out of their zero reference position. However, if there is a fold or overlap in either the top edge 80 or bottom edge 82, the respective pinch wheel will maintain its "null" bias or zero reference position until the fold has been stretched taut. FIGS. 3E through 3J show a series of positions of the pinch wheel as the package passes through them in this last stage of the process as the folds are removed. References are made to positions on a clock face; however, it should be appreciated that the number of subdivisions that are possible, will typically be substantially greater than the twelve hour positions on a clock, and may be on the order of several hundred or thousand positions for a full 360 degrees of rotation.

Figure 3F:
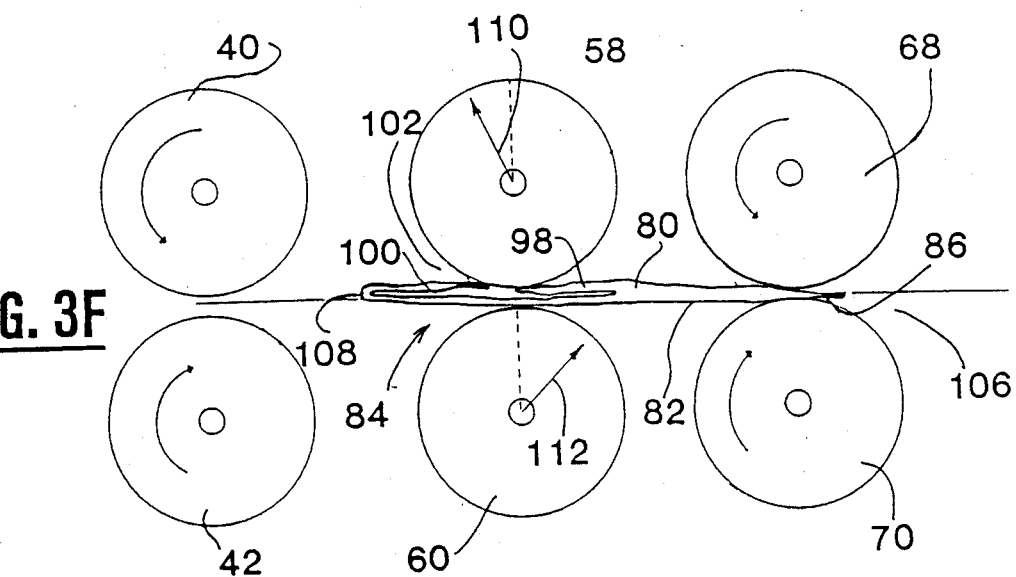

As shown in FIG. 3F, folds 98 and 100 are still present, and package 84 looks substantially the same as it looked in FIG. 3E. However as can be seen, package 84 has progressed a small distance through pinch wheels 58 and 60, and transport wheels 68 and 70. Also it is important to note that arrows 110 on pinch wheel 58 and arrow 112 on pinch wheel 60 are each shown as having moved substantially the same amount (although in opposite directions) to the 10:00 o'clock and 2:00 o'clock positions respectively.

Figure 3G:
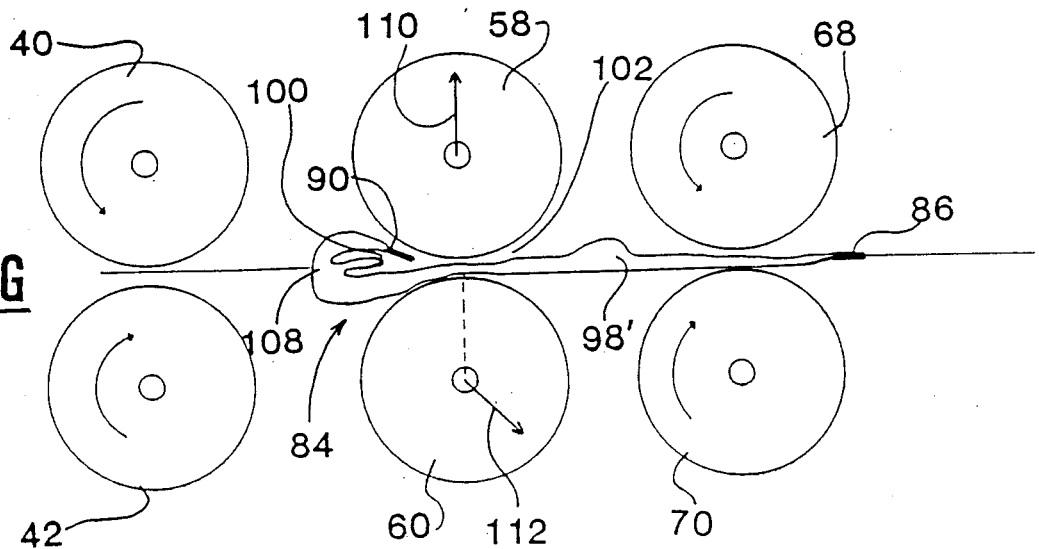

In FIG. 3G, package 84 has moved further through the pinch wheels and transport wheels. And as shown, the bottom pinch wheel 60 has been forced to move even further from its zero reference or 12:00 o'clock position to about a 4:00 o'clock position. During the same period, however, fold 98 in the top edge 80 passes beyond nip 102, and consequently most of the excess material in the fold has been removed as the excess material is moved opposite the direction of travel of the package as pinch wheel 58 returns to its zero or "null" biased position represented by arrow 110 being at 12:00 o'clock. As shown, there still remains a small amount of excess material 98' from fold 98 after pinch wheel 58 has returned to its "null" position. However, since pinch wheel 58 remains biased at the null position, the small amount of material 98' that remained from fold 98 will also be removed as the package continues to be pulled by transport wheels 68 and 70.

Figure 3H:
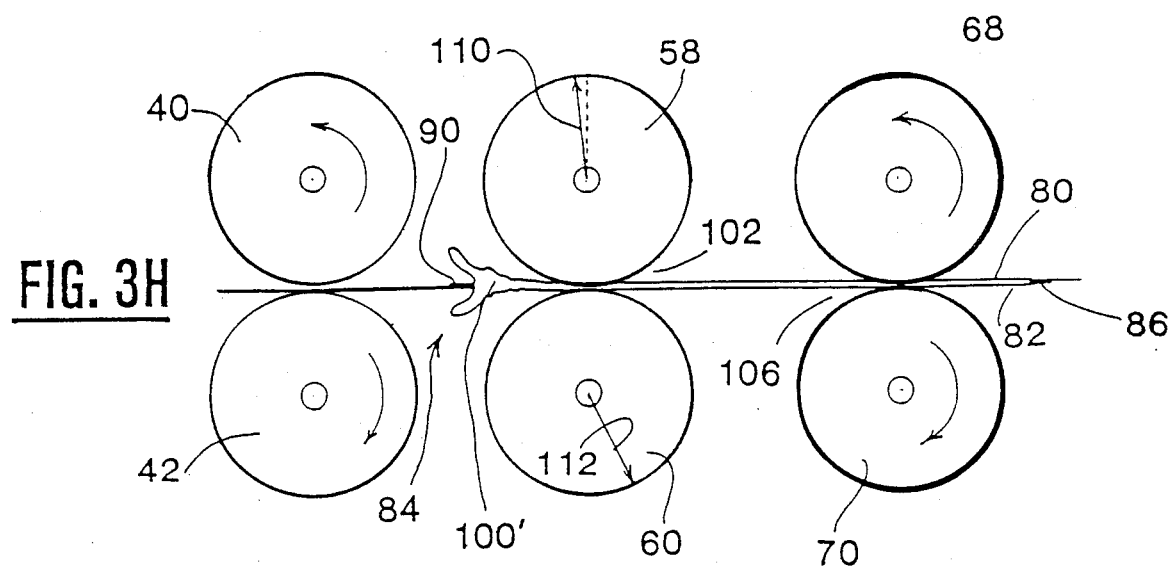

FIG. 3H shows the condition of package edges 80 and 82, and the position of the pinch wheels 58 and 60 just as the last bit of excess material from fold 98 is removed. As shown, pinch wheel 60 has been forced to rotate still further against its bias as is indicated by arrow 112 being at the 5:00 o'clock position while pinch wheel 58 is just beginning again to be forced from its "null" bias position as indicated by arrow 110 being shown just slightly to the left of the 12:00 o'clock position.

Figure 3I:
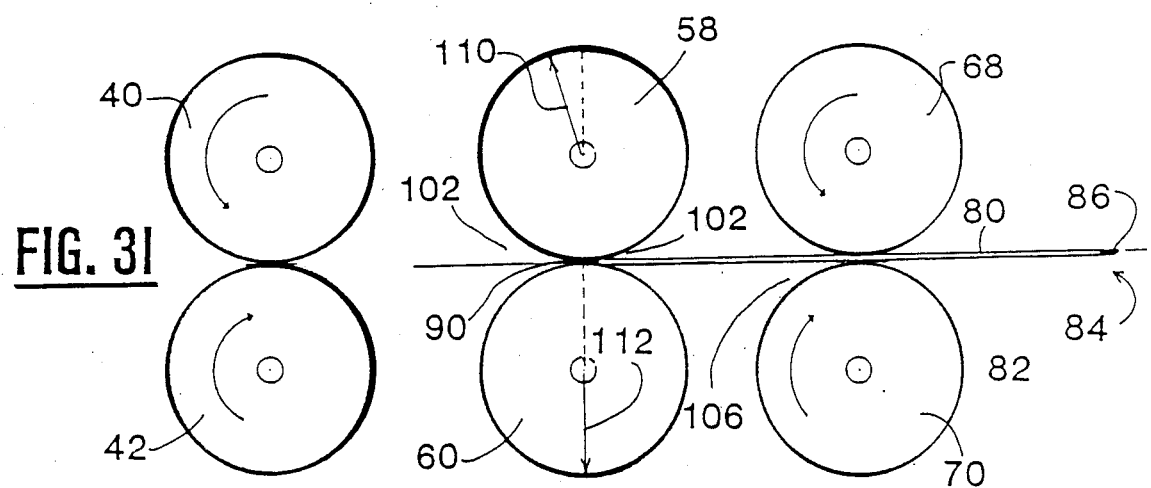

Then as shown in FIG. 3I, just before side edges 90 leaves nip 102 between pinch wheels 58 and 60, the confronting open package edges 80 and 82 of package 84 are without folds or wrinkles such that an air or liquid tight seal can be achieved. It should also be noted that at this point reference arrow 112 shows that pinch wheel 60 has moved even further from null to the 6:00 o'clock position, and reference arrow 110 shows pinch wheel 58 has been forced to the 11:00 o'clock position.

Figure 3J:
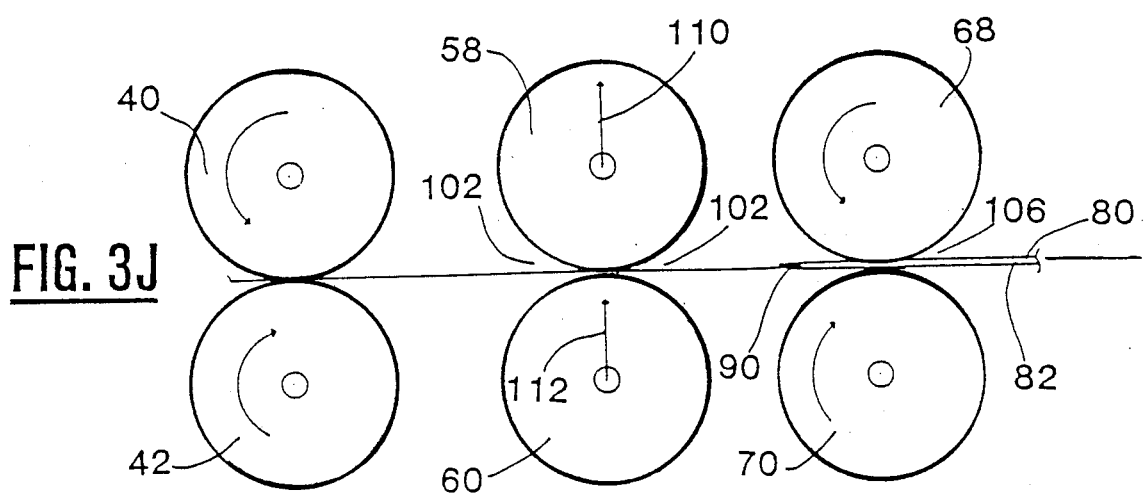

Once the side edge 90 clears the nip 102, both pinch wheels are free to return to their zero or "null" positions as is indicated by FIG. 3J. Also as was discussed above encoders may be used to determine the number of "steps" pinch wheels 58 and 60 are forced from their "null" positions. And, as was apparent from the illustration of FIGS. 3G and 3J, the encoders will then command or send control signals to cause the pinch wheels to move back toward "null" the number of "steps" they were forced from null.

It should also be understood that the illustrations shown in FIGS. 3A through 3J are exemplary only, and are provided to aid in understanding the invention, and that folds and/or wrinkles which also occur in the bottom open edge 82 would be removed in the same manner. Likewise, a multiplicity of folds on both the top and bottom edges could be removed at the same time. It should also be understood that the relative positions of the transport belts 40 and 42 with respect to pinch wheels 58 and 60, as well as the relative positions of the pinch wheels to transport wheels 68 and 70 as was discussed above may be selectively changed depending upon the dimensions of the package being processed.

Thus there has to this point been described the unique apparatus and methods for removing folds and wrinkles from plastic packages to facilitate obtaining a liquid or air tight seal. However, although the present application has been described with respect to specific methods and apparatus, it is not intended that such specific references be considered limitations upon the scope of the invention except as is set forth in the following claims.

I claim:

1. Apparatus for eliminating overlapping material in the open edge of a pliable package comprising:
   a first means engaging said package edge for moving said edge along a predetermined path in a selected direction and at a selected speed;
   first and second pinch wheels located along said predetermined path and in opposing relationship with each other such that their circumferential edges are substantially in contact with each other so as to engage and grip said package edges;
   second means located downstream of said pinch wheels for engaging and moving said package edges with a first known torque along said predetermined path;
   control means for providing control signals;
   drive means responsive to control signals provided from said control means for independently driving said first and second pinch wheels;
   said control signals firstly causing said drive means to drive said pinch wheels so as to move said package edge in said selected direction and at a speed greater than said selected speed while said package edge is engaged by both said first means and said first and second pinch wheels so as to pull said package edge taut therebetween; and
   said control signals secondly causing said pinch wheels to be biased against allowing said package edge to move in said selected direction, with a second torque which is less than said first known torque, while said package edge is engaged between said pinch wheels and said second means so as to eliminate overlapping material in said package edges.

2. The apparatus of claim 1 wherein the torques available from said opposing pinch wheels and said first means are also selected to avoid slipping with respect to said package edge material.

3. The apparatus of claim 2 wherein the torque available from said pinch wheels is more than the torque available from said first means.

4. The apparatus of claim 1, wherein, an edge detector is located along said predetermined path to furnish signals to said control means indicative of the leading edge of a package.

5. The apparatus of claim 1, and further including means for monitoring and providing information to said control means indicating the amount of movement of said pinch wheels.

6. The apparatus of claim 1, wherein said biased pinch wheels are biased to maintain a null position.

7. The apparatus of claim 1 and further including brushes with intersecting tips to remove wrinkles.

8. The apparatus of claim 7 wherein said brushes are cylindrical shaped, and comprise ribbons of bristles wrapped around a cylindrical base in a helical fashion.

9. The apparatus of claim 8, wherein the helical wrap of said bristles on said pair of brushes is chosen so as to create maximum agitation of the package edges by said brushes.

10. The apparatus of claim 1 wherein said drive means is a pair of programmable stepper motors.

11. The apparatus of claims 1, 2 or 6 wherein a portion of said apparatus is located in an enclosure subject to a negative pressure such that air leaves said package and creates an air cushion between said open package edges to facilitate removal of overlapping material.

12. The apparatus of claim 1, and further including means for adjusting the distance between said pinch wheels and said second means for moving along said predetermined path to accommodate different size packages.

13. The apparatus of claims 1, 2, 3, 4, 5, 6, 7, 8, 9 or 12 wherein said package material is a pliable plastic material.

14. A method for substantially eliminating overlapping material in the open edges of a package comprising the steps of:
engaging said package edges with a first means to move said edge along a predetermined path in a selected direction at a selected speed;
providing first signals for controlling a pair of opposing pinch wheels;
engaging the leading edge of said package edges with said pair of opposing pinch wheels while said edges are still engaged by said first means and moving at said selected speed, said pinch wheels being driven in response to said first provided signals so as to move said package edges in said predetermined path and at a faster speed than said selected speed such that said edges are pulled taut between said first means and said pinch wheels;
engaging said leading edge downstream of said pinch wheels with a second means for moving said package edges at substantially said selected speed and at a known torque;
providing second signals to control and bias said pair of opposing pinch wheels against movement of said package edges in said selected direction and with a torque which is less than said known torque so as to eliminate overlapping material in said package edges prior to sealing.

15. The method of claim 14 wherein the torques available from said first means and said pinch wheels are selected to avoid slipping with respect to said package edge.

16. The method of claim 14 and further comprising the step of detecting the edge of a package moving along said predetermined path and generating said first and second signals in response to detecting said edge.

17. The method of claims 14 or 16 and further comprising the steps of monitoring and providing signals with respect to the amount and direction of movement of said pinch wheels and using said signals to return said pinch wheels to a zero reference position.

18. The method of claim 14 wherein said pinch wheels are biased to maintain a selected null position.

19. The method of claim 14 and further comprising the steps of brushing said package edges with a pair of rotating brushes having their bristle tips intersecting to remove wrinkles prior to being engaged by said first means.

20. The method of claim 14 and further comprising the step of providing a pair of individually programmable stepper motors to drive said pinch wheels.

21. The methods of claims 14, 15 or 18 wherein said method is carried out at an air pressure less than atmospheric pressure.

22. The method of claim 17 and further comprising the step of providing a pair of individually programmable stepper motors to drive said pinch wheels.

23. The method of claim 14 and further comprising the step of adjusting the location of said pinch wheels along said predetermined path to accommodate variations in package size.

* * * * *